United States Patent [19]
Hollas et al.

[11] Patent Number: 5,974,126
[45] Date of Patent: *Oct. 26, 1999

[54] METHOD AND TELECOMMUNICATIONS NETWORK FOR CONTROL OF MASS CALLING

[75] Inventors: Markus Hollas, Kornwestheim; Xuan Huy Pham, Usingen; Gernot Stratenberg, Gerlingen; Rupert Barnsteiner, Stuttgart; Horst Wegner, Stuttgart; Kurt Spildener, Stuttgart, all of Germany

[73] Assignee: Alcatel N.V., Rijswijk, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/685,404

[22] Filed: Jul. 24, 1996

[30] Foreign Application Priority Data

Jul. 28, 1995 [DE] Germany .............. 195 27 759

[51] Int. Cl.⁶ .................................................. H04M 15/00
[52] U.S. Cl. ..................... 379/137; 379/133; 379/139; 379/279
[58] Field of Search ............................ 379/133–134, 379/220–221, 219, 279, 112–113, 138–139

[56] References Cited

U.S. PATENT DOCUMENTS

| | | | |
|---|---|---|---|
| 4,511,762 | 4/1985 | Stockdale ............................. | 379/279 |
| 4,626,624 | 12/1986 | Daisenberger ........................ | 379/279 |
| 5,068,892 | 11/1991 | Livanos ................................ | 379/221 |
| 5,295,183 | 3/1994 | Langlois et al. ..................... | 379/113 |
| 5,450,483 | 9/1995 | Williams .............................. | 379/221 |
| 5,500,889 | 3/1996 | Baker et al. ......................... | 379/220 |
| 5,509,063 | 4/1996 | Crabtree et al. ..................... | 379/220 |
| 5,539,815 | 7/1996 | Samba .................................. | 379/220 |

FOREIGN PATENT DOCUMENTS 4413960 10/1995 Germany .

OTHER PUBLICATIONS

Greene, T.V. et al: Network Management and Traffic Administration. In: The Bell System Technical Journal, vol. 56, No. 7, Sep. 1977, pp. 1169–1202.

Haenschke, Detley G., et al. Network Management and Congestion in the U.S. Telecommun. Network: In: IEEE Trans. on Commun. vol. COM–29, No. 4, Apr. 1981, 376–384.

"Telephone Network and ISDN—Quality of Service, Network Management and Traffic Engineering" from Recommendation E.412, pp. 1–14—CCIT, Oct. 1992.

*Primary Examiner*—Paul Loomis
*Assistant Examiner*—Duc Nguyen
*Attorney, Agent, or Firm*—Ware. Fressola, Van Der Sluys & Adolphson LLP

[57] ABSTRACT

It is proposed that in a telecommunications network (KN) for control of mass callings to subscribers of the telecommunications network (KN) with exchanges (VST1, . . . , VST7), each of which has a control means (SM1), to perform measurements to detect a mass calling to a subscriber exclusively in those exchanges (VST1, . . . , VST5) of the telecommunications network (KN) to which a subscriber, who is the possible target of such a mass calling, is connected. The exchange (VST1) which detects the mass calling signals its occurrence to respective predetermined further exchanges (VST2, . . . , VST5, VST7) in the telecommunications network (KN). Each of the predetermined further exchanges (VST2, . . . , VST5, VST7) and the exchange (VST1) which detects the mass calling, chokes the traffic to this subscriber at a rate that is fixed for the respective predetermined further exchange.

18 Claims, 2 Drawing Sheets

METHOD AND TELECOMMUNICATIONS NETWORK FOR CONTROL OF MASS CALLING

TECHNICAL FIELD

The invention concerns a method for control of mass calling to subscribers of a telecommunications network with exchanges, and a telecommunications network for control of mass calling in a telecommunications network.

BACKGROUND OF THE INVENTION

Mass calling events to subscribers of a telecommunications network, for example prompted by surveys or puzzles on radio or TV shows, can lead to bottlenecks or blockages in the telecommunications network. Many short-time usages taking place in the telecommunications network exchanges within a limited time interval, displace normal commercial usages. When the telecommunications network operator has been previously informed of such actions, the use of choke mechanisms, for example "call gapping" or "leaky bucket" from the CCITT recommendation E.412, is known to reduce or prevent bottlenecks or blockages in the telecommunications network.

SUMMARY OF THE INVENTION

It is the task of this invention to reduce or to prevent bottlenecks or blockages in the telecommunications network, which are caused by mass calling to subscribers. This task is fulfilled by a method for control of mass calling to subscribers in a telecommunications network with exchanges, wherein detection of mass-calling situations to subscribers is carried out exclusively in those exchanges to which said subscriber is connected, and wherein choking of the traffic to that subscriber is carried out to whom the excessive number of calls of the mass-calling situation detected by the exchange to which this subscriber is connected are destined. It is also fulfilled by a telecommunications network for control of mass calling in a telecommunications network, comprising: exchanges, each comprising a control means; subscriber stations connected to exchanges; and a program module stored in the respective control means of those exchanges to which one of the subscribers is connected, the program module being used to detect an excessive number of calls to one of the subscribers connected to the respective exchange, which then chokes the traffic to that subscriber to whom the excessive number of calls are destined.

A basic idea of the present invention can be seen in that measurements for detecting mass calling situations are performed exclusively in those exchanges of the telecommunications network to which subscribers, who may be a possible target of such mass callings, are connected.

Advantageously, the exchange which detects a mass calling signals its occurrence to predetermined further exchanges in the telecommunications network. Each of these predetermined further exchanges, and the exchange detecting the mass calling situation, chokes the traffic routed to this subscriber via the particular exchange at a rate that is fixed for the respective predetermined further exchange.

In an advantageous further configuration of the invention, the exchange first detects a tendency toward mass calling, before it performs the actual identification of the subscriber for whom a mass calling is destined.

Further advantageous configurations of the invention can be found in the dependent patent claims.

BRIEF DESCRIPTION OF THE DRAWINGS

To clarify the invention, configuration examples are described in the following by means of FIGS. 1 and 2, where.

BEST MODE FOR CARRYING OUT THE INVENTION

Figure 1:
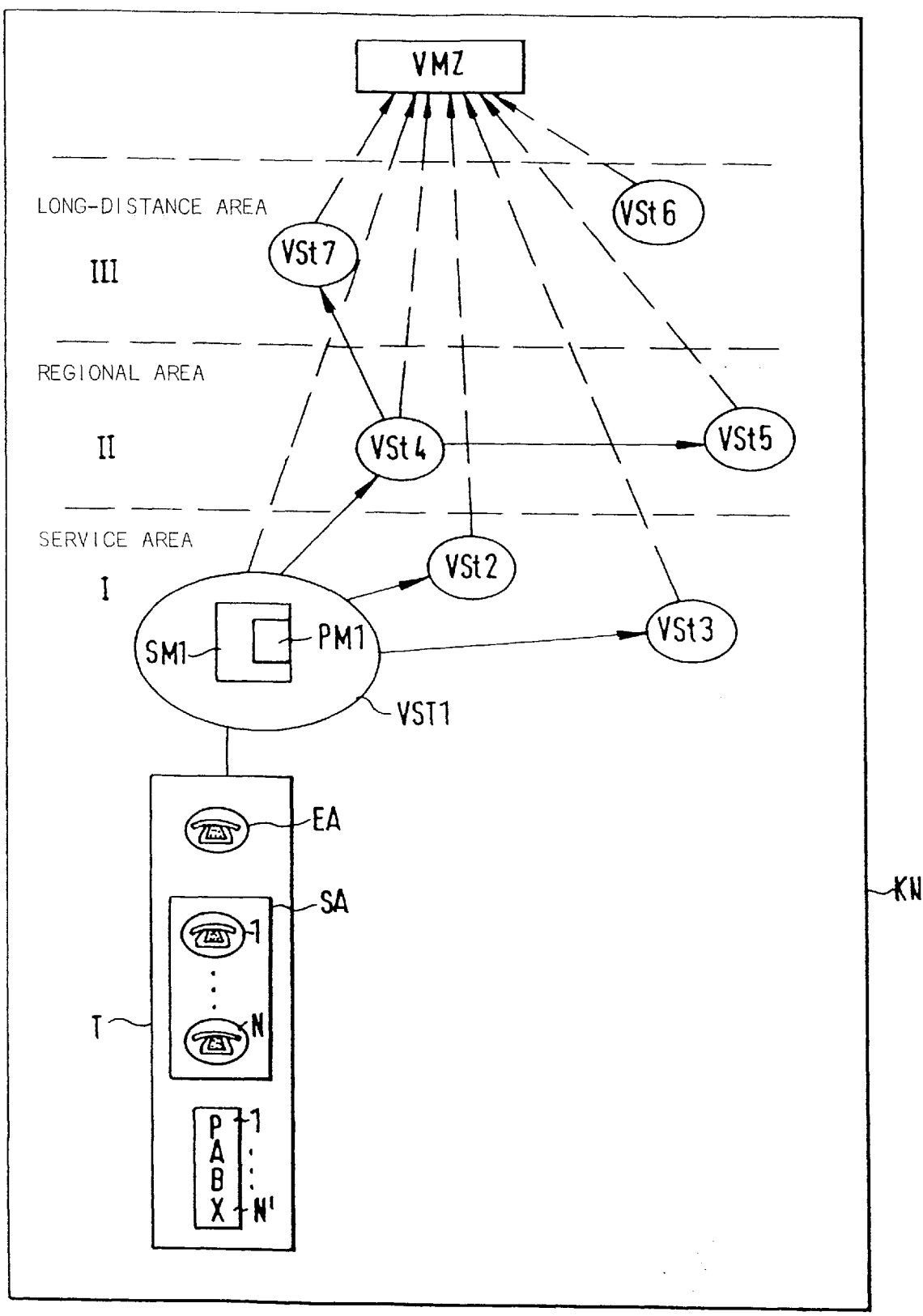
FIG. 1 is a configuration example of a telecommunications network according to the invention.

A configuration example in FIG. 1 illustrates a telecommunications network KN for control of mass callings to subscribers of the telecommunications network KN. Mass calling means that a large number of connections must be simultaneously established to a subscriber. Said number of connections to be established, which characterizes a mass calling, depends on the structure of the telecommunications network. The occurrence of the mass calling to the subscriber results in bottlenecks or blockages in the telecommunications network, so that normal traffic is dislodged.

In the present configuration example, the telecommunications network KN is divided into a service area I, a regional area II and a long-distance area III. This division is usual in existing telecommunications networks, but is not required to carry out the invention. Service area I comprises three exchanges VST1, VST2 and VST3. A number of subscribers are connected to each of these exchanges, represented in the present configuration example by subscriber T, who is connected to exchange VST1. As illustrated in FIG. 1, the subscriber T can be a private branch exchange PABX with N' connections, a collective line SA with a number of subscriber stations 1, . . . , N, or a subscriber station EA which is a main station line. In the present configuration example, regional area II comprises two exchanges VST4 and VST5. Further subscribers can be connected to these exchanges VST4 and VST5, but are not illustrated in FIG. 1. In the present configuration example, long-distance area III comprises two exchanges VST6 and VST7. In the present configuration example, no subscribers are connected to exchanges VST6 and VST7. The telecommunications network additionally comprises a central control facility VMZ. The exchanges VST1, . . . , VST7 are intermeshed by means of not illustrated connection lines. Each of the exchanges VST1, . . . , VST7 has a control means, represented by control means SM1 in exchange VST1 of FIG. 1. The exchanges VST1, . . . , VST5, to which subscribers who may be possible targets of a mass calling are connected, also comprise a program module for the control of mass callings, which is stored in the respective control means. The program module PM1 of exchange VST1 in FIG. 1 is a representative illustration.

In the present configuration example, exchanges VST1, . . . , VST7 transmit predetermined information for acquisition and evaluation, and particularly for statistical purposes, to the central control facility VMZ. In the present case, such information is especially data that identifies a mass calling to a subscriber. The central control facility VMZ is advantageous for carrying out this invention, but is not required. It is possible to perform the control within the telecommunications network KN exclusively by sending signals between the individual exchanges of the telecommunications network KN, thereby omitting the central control facility VMZ. But it is also possible to perform the control of the telecommunications network KN exclusively via the central control facility VMZ.

In the present configuration example, the exchange VST1 detects a mass calling to the subscriber station EA, connected as a main station line, of subscriber T who is connected to the exchange VST1. To enable taking suitable measures against the occurrence of the mass calling, the exchange VST1 which detects the mass calling signals the occurrence of the mass calling to further exchanges in the telecommunications network KN. To that end, the control means SM1 of exchange VST1 stores a list of exchanges which must be notified in case a mass calling occurs. In the present configuration example, the exchanges to be notified are exchanges VST2, . . . , VST5 and VST7. Further exchanges to be notified may be listed in the control means of the exchanges that must be notified. The occurrence of the mass calling is also signalled to the central control facility VMZ. In FIG. 1, the signalling of the mass calling detected by exchange VST1 is indicated by arrows to the exchanges that must be notified. In the present case, exchanges VST5 and VST7 are notified of the occurrence of the mass calling by exchange VST4.

Figure 2:
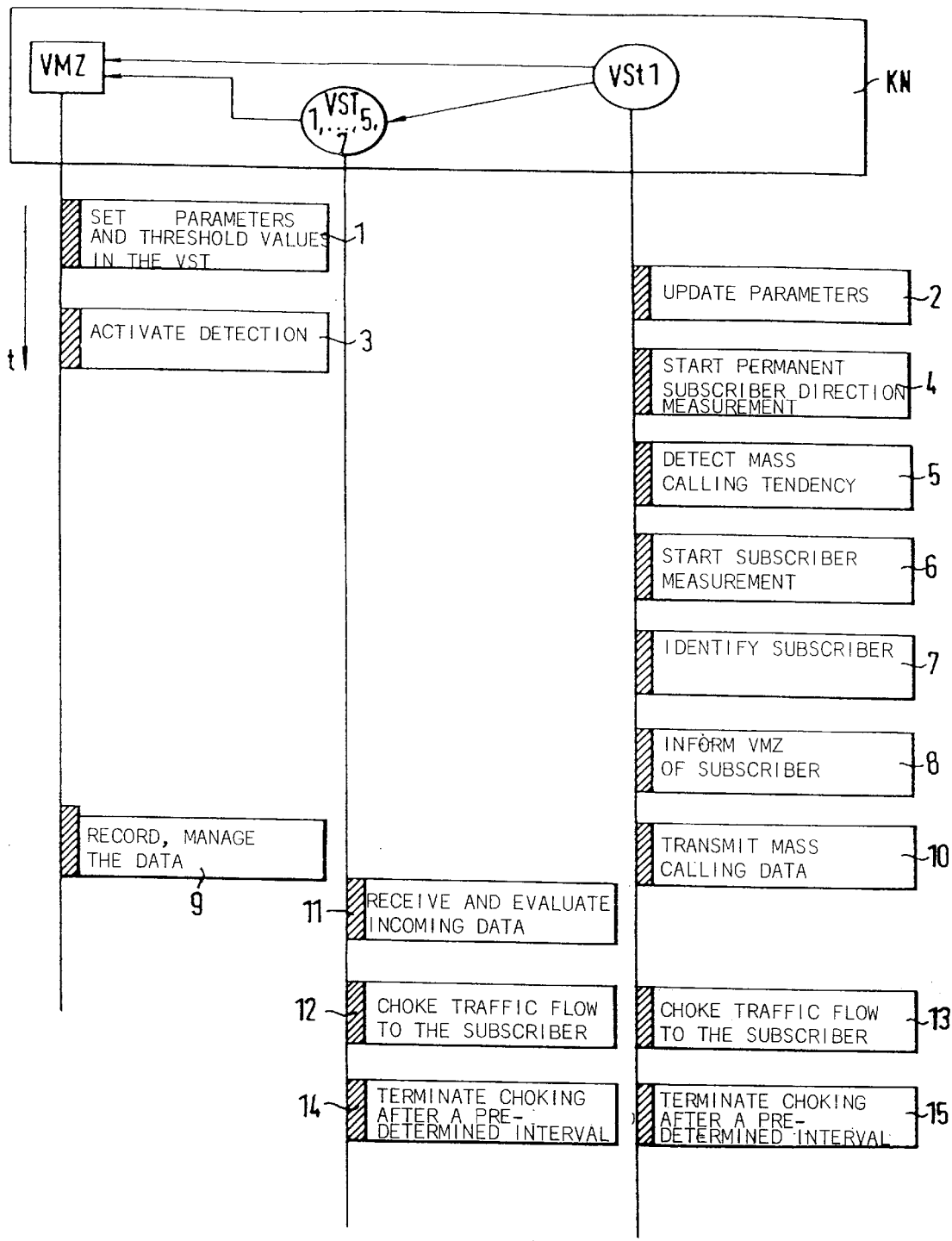
FIG. 2 is a flow chart configuration example of a method according to the invention.

The following describes the operating mode of the telecommunications network KN for the control of mass callings. To that end FIG. 2 illustrates a configuration example of a flow chart according to the method of the invention to be carried out in the telecommunications network KN. In FIG. 2, the steps of the method to be carried out are arranged according to the place where they are carried out, namely the exchange VST1 which detects the mass calling, the predetermined further exchanges VST2, . . . , VST5 and VST7, and the central control facility VMZ.

For example, in step 1 a service terminal connected to the central control facility VMZ is used to enter the setting of parameters that describe the characteristics of the method of the invention, which are transmitted to the exchanges VST1, . . . , VST7 of the telecommunications network KN. In the present configuration example of the method of the invention, a subscriber threshold value is entered as a special parameter for the accurate determination of the mass calling target, a subscriber direction threshold value is entered for the detection of a mass calling tendency, and choke rates for the exchanges of the telecommunications network KN are entered for the case when a mass calling occurs and the respective exchange must choke the traffic which passes through it, to the respective subscriber who is the target of the mass calling. In this instance choking means that the respective exchange reduces the traffic which passes through it, to the subscriber. In the present configuration example, the traffic to the subscriber is limited to a predetermined number of retransmitted calls per unit of time, i.e. to the predetermined choke rate. Calls which are not retransmitted are rejected by the exchange. The calling subscriber stations receive a busy signal.

In step 2 the parameters entered in step 1 into the respective exchanges are updated. Then in step 3 the central control facility VMZ activates the detection of a mass calling for the telecommunications network KN. In step 4 a permanent subscriber direction measurement is started by exchanges VST1, . . . , VST5 to which the subscribers who may be possible targets of a mass calling are connected, by means of its control means and the program module stored therein. This permanent subscriber direction measurement takes place for example within a 10 second clock time. In this case subscriber direction measurement means that at first no individual measurement for detecting a mass calling is carried out for each of the subscribers connected to the respective exchange, rather, to reduce the measuring effort, a group of subscribers is combined into a subscriber direction for which a tendency toward the mass calling is checked. To that end the respective exchange determines the number of successful line calls leading to a connection with any subscriber in said subscriber direction, and the number of call attempts in said subscriber direction. The call attempts include both successful and unsuccessful calls received at the respective exchange for said subscriber direction. A subscriber direction value is established from the quotient of the determined number of successful calls and the determined number of call attempts. Then in step 5 said subscriber direction value is compared with the subscriber direction threshold value, and a tendency toward a mass calling is established if the subscriber direction value falls below the subscriber direction threshold value. Combining a group of subscribers into a subscriber direction is possible for example by using the call number of these subscribers as a characteristic of the subscriber direction. In that way the subscribers in the present configuration example are combined for example into a subscriber direction whose first three digits coincide with the call number. But it is also possible to use other criteria for combining subscribers into a subscriber direction. If several mass calling tendencies are detected in step 5, the mass calling tendency with the lowest subscriber direction value is established as the most important one. The detection of the tendency toward a mass calling carried out in steps 4 and 5 is not required to carry out the invention. It can be omitted, so that the mass calling to the exact subscriber is checked directly. It can also be envisioned for the method of detecting the tendency toward a mass calling to be carried out in a different manner.

If a mass calling tendency is detected in step 5 by the exchange VST1 for a subscriber direction, a parallel subscriber measurement is then started in step 6 to determine exactly which subscriber is the target of the mass calling. This parallel subscriber measurement is carried out for the remaining digits of the call number of the subscribers combined into the subscriber direction. In step 7 the exact subscriber who is the target of the mass calling is identified. To that end a subscriber value is determined, which results from the quotient of the number of successful calls to the subscriber and the number of all the call attempts to the subscriber which were received in exchange VST1. Thus, only one subscriber value is determined for all the subscribers combined into the subscriber direction, which is subsequently compared with the subscriber direction threshold value. The mass calling to said subscriber is detected if the subscriber value falls below the subscriber direction threshold value. If several subscribers are detected as the targets of mass callings, the subscriber with the lowest subscriber direction threshold value is established as the most important one. It is possible for the method of determining the subscriber who is the target of the mass calling to be carried out in a different manner.

Then in step 8 the subscriber detected in step 7, who is the target of the mass calling, is recorded in a list of the exchange, and transmitted to the central control facility VMZ together with other data concerning said mass calling. For example, such other data concerning said mass calling could be the information from the exchange which determined the subscriber who is the target of the mass calling, the indication of the call number of the determined subscriber, the further exchanges which are notified of the occurrence of the mass calling, and the rate at which the traffic to the subscriber who is the target of the mass calling is choked. In step 9 the central control facility VMZ receives the transmitted data concerning the detected mass calling, and stores it in a memory for further evaluation. In step 10, the exchange VST1 which detects the mass calling transmits the data concerning the mass calling to the predetermined further exchanges of the telecommunications network KN. In the present configuration example, these predetermined further exchanges are all the neighboring exchanges VST2, VST3, VST4 and VST5 of exchange VST1, and all the exchanges of the long-distance area III which route descending traffic to the exchange VST1, in this instance VST7. Said predetermined further exchanges are defined in a list of exchange VST1, or in lists of the predetermined further exchanges, which can be changed. In step 11 the predetermined further exchanges receive the transmitted data concerning the mass calling, then store and evaluate them, particularly to determine the choke parameters. In step 12 the predetermined further exchanges begin to choke the traffic that passes through them to the subscriber who is the target of the mass calling, at a rate that is fixed for this respective predetermined further exchange. The same is done in step 13 by the exchange VST1 which detects the mass calling. The choke rate can be fixed individually for each exchange of the telecommunications network KN. In the present configuration example the choke rate for the exchanges of service area I and regional area II is $R_{D1}=X/(T \times K)$. In this case $R_{D1}$ is the choke rate, X the number of connections to the subscriber who is the target of the mass calling, T the average length of a call to the subscriber and K the number of exchanges in service area I and in regional area II which participate in the traffic choking. The choke rate for exchanges in the long-distance area III is $R_{D2}=X/(T \times K \times M)$. In this case $R_{D2}$ is the choke rate and M the number of exchanges in the long-distance area III. The exchanges of the telecommunications network KN which participate in the choking of the traffic to the subscriber who is the target of the mass calling, transmit their data concerning the mass calling, in particular the choke rates, to the central control facility VMZ.

Based on the transmitted data, the central control facility VMZ can perform an evaluation of the detected mass calling. If required, the possibility exists for the central control facility VMZ to make a change in the choking of the traffic to the subscriber who is the target of the mass calling, which is prompted by the exchanges VST1, . . . , VST5 and VST7. It is also possible for a comparison in the central control facility VMZ between the momentary mass calling situation and similar mass calling situations known from prior events to lead to a correction proposal on the part of the central control facility VMZ for control of the mass calling. Said proposed changes for control of the mass calling are signalled by the central control facility VMZ to exchanges VST1, . . . , VST5 and VST7 of the telecommunications network KN that participate in the choking, which then translate said proposals directly. The effects of the changes for control of the mass calling are announced by the participating exchanges to the central control facility VMZ, which then also evaluates these effects and possibly corrects them anew. This possible prompting of changes for control of the mass calling is not required for carrying out the invention, but is advantageous since it enables a more effective control of the mass calling. Known choke methods such as leaky bucket or call gapping are used to choke the traffic.

In steps 14 and 15, the choking of traffic to the subscriber who is the target of the mass calling, which is performed by the respective exchanges, is terminated after a predetermined time, e.g. 30 minutes. This predetermined time to end the choking can be changed. In this way a possible continuous activation and deactivation of the choking can be prevented in the exchanges.

What is claimed is:

1. A method for control of mass calling to a subscriber from among a plurality of subscribers in a telecommunications network (KN), the telecommunications network having exchanges (VST1, . . . VST7), wherein detection of a mass-calling situation to said subscriber is carried out exclusively in the exchange (VST1, . . . VST5) to which said subscriber is connected by first establishing a subscriber direction value and then using a parallel subscriber measurement, and wherein when a mass-calling situation to said subscriber (T) is detected, choking at one or more of the exchanges (VST1, . . . VST7) only the traffic intended for said subscriber (T), the choking at a rate based on the number of connections of said subscriber to the exchange to which said subscriber is connected.

2. A method as claimed in claim 1, further wherein the occurrence of the mass-calling situation is signaled to predetermined further exchanges (VST2, . . . , VST5, VST7), and wherein in the predetermined further exchanges the traffic intended for said subscriber (T) is choked by being limited to a rate fixed for the respective predetermined further exchange.

3. A method as claimed in claim 1, further wherein in the exchange to which said subscriber (T) is connected, a subscriber value is determined by forming the quotient of the number of successful calls to said subscriber (T) and the number of call attempts received at the exchange to which said subscriber (T) is connected, wherein said subscriber value is compared with a subscriber threshold value, and wherein the mass-calling situation is detected when the subscriber value falls below the subscriber threshold value.

4. A method as claimed in claim 1, further wherein a subscriber direction value is determined by forming the quotient of the number of successful calls to a subscriber direction and the number of call attempts received at an exchange for said subscriber direction, wherein said subscriber direction value is compared with a subscriber direction threshold value, wherein a tendency towards the mass-calling situation is detected when the subscriber direction value falls below the subscriber direction threshold value, and wherein detection of the mass-calling situation is carried out when said tendency towards the mass-calling situation has been detected.

5. A method as claimed in claim 1, further wherein the choking of the traffic to said subscriber (T) is terminated after the lapse of a predetermined interval of time following the detection of the mass-calling situation.

6. A method as claimed in claim 1, further wherein the telecommunications network (KN) comprises a central control facility (VMZ), wherein signaling messages are transferred between the exchanges (VST1, . . . , VST7), and wherein after detection of the mass-calling situation, predetermined data characteristic of the mass-calling situation are transmitted to the central control facility (VMZ) for evaluation.

7. A method as claimed in claim 6, further wherein in response to the transmitted predetermined data, the central control facility (VMZ) initiates a change in the choking of the traffic.

8. A telecommunications network (KN) for control of mass calling to a subscriber from among a plurality of subscribers in the telecommunications network (KN), comprising:

exchanges (VST1, . . . VST7) each comprising a control means (SM1);

subscriber stations (T) connected to exchanges (VST1, ... VST5); and a program module (PM1) stored in the respective control means (SM1) of those exchanges (VST1, ..., VST5) to which subscribers are connected, wherein detection of an excessive number of calls to said subscriber (T) connected to the respective exchange is carried out exclusively by the program module (PM1) by first establishing a subscriber direction value and then using a parallel subscriber measurement, and upon detection of an excessive number of calls, only traffic to said subscriber (T) is choked at one or more of the exchanges (VST1, ..., VST7), and wherein the choking is at a rate based on the number of connections of said subscriber to the exchange to which said subscriber is connected.

9. A method as claimed in claim 1, further wherein the choking is based on the average length of a call to said subscriber.

10. A method as claimed in claim 8, further wherein the choking is based on the average length of a call to said subscriber.

11. A method for control of mass calling to a subscriber from among a plurality of subscribers in a telecommunications network (KN), the telecommunications network having exchanges (VST1, ... VST7), wherein detection of a mass-calling situation to said subscriber is carried out exclusively in the exchange (VST1, ... VST5) to which said subscriber is connected by first establishing a subscriber direction value and then using a parallel subscriber measurement, and wherein when a mass-calling situation to said subscriber (T) is detected, choking at one or more of the exchanges (VST1, ..., VST7) only the traffic intended for said subscriber (T), and further wherein the occurrence of the mass-calling situation is signaled to a predetermined further exchange (VST2, ..., VST5, VST7), and wherein in the predetermined further exchange the traffic intended for said subscriber (T) is choked by being limited to a rate fixed for the respective predetermined further exchange, the rate based on the number of connections of said subscriber to the exchange to which said subscriber is connected.

12. A telecommunications network (KN) for control of mass calling to a subscriber from among a plurality of subscribers in the telecommunications network (KN), comprising:

exchanges (VST1, ..., VST7) each comprising a control means (SM1);

subscriber stations (T) connected to exchanges (VST1, ... VST5); and a program module (PM1) stored in the respective control means (SM1) of those exchanges (VST1, ..., VST5) to which subscribers are connected, wherein detection of an excessive number of calls to said subscriber (T) connected to the respective exchange is carried out exclusively by the program module (PM1) by first establishing a subscriber direction value and then using a parallel subscriber measurement, and upon detection of an excessive number of calls, only traffic to said subscriber (T) is choked at one or more of the exchanges (VST1, ..., VST7), and further wherein the occurrence of the mass-calling situation is signaled to predetermined further exchanges (VST2, ..., VST5, VST7), and wherein in the predetermined further exchanges the traffic intended for said subscriber (T) is choked by being limited to a rate fixed for the respective further exchanges, the rate based on the number of connections of said subscriber to the exchange to which said subscriber is connected.

13. A method as claimed in claim 1, wherein the parallel subscriber measurement comprises the steps of:
 a) determining the number of successful line calls in a predetermined period of time leading to a connection to said subscriber;
 b) determining the total number of line calls in the predetermined period of time to said subscriber; and
 c) determining the quotient formed from the number of successful line calls divided by the total number of calls.

14. A method as claimed in claim 13, wherein said establishing of a subscriber direction value comprises the steps of:
 a) combining a group of subscribers including said subscriber into a subscriber direction;
 b) determining the number of successful line calls in a predetermined period of time leading to a connection to any subscriber in the subscriber direction;
 c) determining the total number of line calls in the predetermined period of time to any subscriber in the subscriber direction; and
 d) determining the quotient formed from the number of successful line calls divided by the total number of calls.

15. A method as claimed in claim 14, further wherein a subscriber direction is formed from subscribers having the same first three digits of a telephone number.

16. A telecommunications network (KN) as claimed in claim 8, wherein the parallel subscriber measurement comprises the steps of:
 a) determining the number of successful line calls in a predetermined period of time leading to a connection to said subscriber;
 b) determining the total number of line calls in the predetermined period of time to said subscriber; and
 c) determining the quotient formed from the number of successful line calls divided by the total number of calls.

17. A telecommunications network (KN) as claimed in claim 16, wherein said establishing of a subscriber direction value comprises the steps of:
 a) combining a group of subscribers including said subscriber into a subscriber direction;
 b) determining the number of successful line calls in a predetermined period of time leading to a connection to any subscriber in the subscriber direction;
 c) determining the total number of line calls in the predetermined period of time to any subscriber in the subscriber direction; and
 d) determining the quotient formed from the number of successful line calls divided by the total number of calls.

18. A telecommunications network (KN) as claimed in claim 17, further wherein a subscriber direction is formed from subscribers having the same first three digits of a telephone number.

* * * * *